UNITED STATES PATENT OFFICE.

JOHN M. ALLEN, OF MARION, MASSACHUSETTS.

IMPROVEMENT IN PROCESSES FOR THE MANUFACTURE OF PAPER FROM CONIFEROUS TREES.

Specification forming part of Letters Patent No. 222,171, dated December 2, 1879; application filed March 25, 1875.

*To all whom it may concern:*

Be it known that I, JOHN M. ALLEN, of Marion, in the county of Plymouth and State of Massachusetts, have invented a new Improvement in the Process of the Manufacture of Paper from Coniferous Trees; and I do hereby declare that the following is a full and exact description of the same.

To make a pliable and merchantable paper from the bark of coniferous trees it is necessary to exhaust, or nearly exhaust, the intercellular or tannic substances therefrom, since if they are retained the paper produced will be harsh and hard, and will have a stiffness like parchment, such intercellular or tannic substances acting as a "size" to stiffen the paper, and if the stock is subjected to heat it will become discolored and cannot be thoroughly bleached.

I have also found that to extract the intercellular or tannic substances it is necessary to treat the bark of coniferous trees with cold or tepid water, since if treated with hot water or steam the stock becomes discolored.

My invention therein consists in exhausting, or nearly exhausting, the intercellular or tannic substances from the bark of coniferous trees by treating the same with cold or tepid water; further, in a pulp made from the bark of coniferous trees having the intercellular or tannic substances exhausted, or nearly exhausted, therefrom; further, in the process of making paper-pulp from the bark of coniferous trees, consisting in treating the bark with cold or tepid water, macerating such bark either before or after the treatment with cold or tepid water, and then bleaching the stock, as fully hereinafter explained.

My invention also consists in the paper, as a new article of manufacture, made from the bark of coniferous trees with the intercellular or tannic substances exhausted, or nearly exhausted, therefrom. This paper is very pliable and tough, light in color, (if bleached,) and smooth and fine in texture. It can be readily distinguished by experts from the paper previously made from the bark of coniferous trees wherein the intercellular or tannic substances were retained as a size, since said last-mentioned paper is stiff and harsh, presenting a different appearance to the eye and a different feeling to the touch.

The bark of coniferous trees, preferably macerated by any of the ordinary methods, or taken from the trees without maceration, is put at once into the pulping-engines, where it is beaten and thoroughly washed by passing through it a stream of cold or tepid water continuously. The coloring-matter peculiar to this paper-stock and to no other, which is highly soluble in water, is driven into the water and carried off by this operation, which should continue from four to ten hours. Gallo-tannic acid, one of the injurious constituents of this stock, decomposes and darkens at a temperature of 160° Fahrenheit; therefore the temperature of the water in the engines should never exceed that degree of heat, the best temperature being about 80° Fahrenheit. At the expiration of this operation the pulp is ready at once to be run into paper in the usual way.

If it is desired to lighten the color of the pulp it may be acidulated by some dilute acid, preferably sulphuric acid. This acid is then washed out and the pulp then run into paper in the usual way.

For very light-colored and white papers the pulp should be treated to a solution of chlorinated alkali, preferably chlorinated soda, the strength of this solution depending on the degree of whiteness desired.

I have found, in bleaching this stock, that it is obstinate under treatment when chlorine alone is held in the water; but as soon as a little soda or potash is thrown in the stock begins to bleach at once.

The slightest degree of strength of alkali in the solution improves the color of the pulp, and the greatest degree of strength does no injury.

By this treatment, in the first instance, of water of the temperature described, the color of the bark stock is lightened as the intercellular or coloring matter in the bark is washed out, thus avoiding the injurious effect of boiling, by which latter operation the color is set and the resin fused, thus cementing the fibers together and affecting the color of the pulp very badly.

I have found, however, in practice that this species of bark, although easily bleached as a whole by the above method, is apt to retain clusters of fibers of the outer bark, which resist the process of bleaching and appear as red hairs in a ground of white or very light paper. In order to treat such bark properly and completely, when I desire a white, or nearly white, paper, I boil the disfibered bark after the treating and washing before described in a lime-water from four to sixteen hours, which time is regulated by the amount of lime used, which varies from one to four barrels to two tons of stock. After this boiling the bleaching, if any is requisite, is performed as above described.

I am aware that alkalies have been used in the manufacture of paper-pulp; but they have been applied directly to the bark, and are thereby in part neutralized by the tannic acid.

I am also aware that it is not new to macerate bark with water and alkalies for the purpose of converting its resinous properties into a size; but I believe that I am the first to have conceived the idea of treating the bark of coniferous trees with cold or tepid water, and the subsequent treatment with acids or chlorinated alkalies, or the intermediate treatment with lime-water; and, therefore,

What I claim as my invention, and desire to secure by Letters Patent, is—

1. In the process of making paper-pulp from the bark of coniferous trees, exhausting, or nearly exhausting, the intercellular or tannic substances by treating such bark with cold or tepid water, substantially as described.

2. A paper-pulp made from the bark of coniferous trees having the intercellular or tannic substances exhausted therefrom, in the manner substantially as described.

3. The process of making paper-pulp from the bark of coniferous trees, consisting in exhausting, or nearly exhausting, the intercellular or tannic substances by treating such bark either before or after maceration with cold or tepid water and then bleaching such stock, substantially as described.

4. As a new article of manufacture, paper made from the bark of coniferous trees having the intercellular or tannic substances exhausted therefrom, substantially as described.

This specification signed and witnessed this 8th day of March, 1875.

JOHN M. ALLEN.

Witnesses:
M. M. DAVISON,
DANIEL RHODES.